United States Patent
Fisher et al.

(10) Patent No.: US 6,535,600 B1
(45) Date of Patent: Mar. 18, 2003

(54) SYSTEM FOR AUTOMATICALLY ROUTING CALLS TO CALL CENTER AGENTS IN AN AGENT SURPLUS CONDITION BASED ON SERVICE LEVELS

(75) Inventors: Thomas S. Fisher, Westminster, CO (US); Roy A. Jensen, Westminster, CO (US); Martin I. Reiman, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/454,508

(22) Filed: Dec. 6, 1999

(51) Int. Cl.[7] ................................................. H04Q 3/64
(52) U.S. Cl. ............................ 379/265.12; 379/266.09; 379/265.02
(58) Field of Search ....................... 379/265.02, 265.12, 379/266.09

(56) References Cited

U.S. PATENT DOCUMENTS

| | | |
|---|---|---|
| 5,206,903 A | 4/1993 | Kohler et al. |
| 5,506,898 A | 4/1996 | Costantini et al. |
| 5,721,770 A | 2/1998 | Kohler |
| 5,825,869 A * | 10/1998 | Brooks et al. ......... 379/265.12 |
| 5,903,641 A * | 5/1999 | Tonisson ............... 379/265.12 |
| 6,052,460 A * | 4/2000 | Fisher et al. ........... 379/265.12 |
| 6,130,942 A * | 10/2000 | Stenlund ..................... 376/266 |

* cited by examiner

Primary Examiner—Ahmad F. Matar
(74) Attorney, Agent, or Firm—Patton Boggs LLP (57) ABSTRACT

The system for automatically routing calls to call center agents in an agent surplus condition provides the call center administrator with an automatic agent assignment paradigm which functions to automatically increase the efficiency of assigning multiple skill agents to contacts. The presence of an agent surplus condition provides the present system with a plurality of choices in the assignment of the agent to process a presently received contact. Since the agents who staff the call center include multiple skill agents, the system must make a determination of not only which of the available agents is the best equipped to handle the present contact, but also how that assignment statistically effects the efficiency of successive assignments of agents to contacts next received, based upon the past performance of the agents and the call center. Since the traffic load presented to the call center tends to be highly variable and of content that is difficult to predict, the present system provides several automatic agent assignment paradigms that each have a statistically different impact on the performance of the call center, based upon the quality and quantity of the incoming calls.

17 Claims, 5 Drawing Sheets

SYSTEM FOR AUTOMATICALLY ROUTING CALLS TO CALL CENTER AGENTS IN AN AGENT SURPLUS CONDITION BASED ON SERVICE LEVELS

CROSS-REFERENCE TO RELATED APPLICATIONS

This application is related to three applications by the inventors named in this application, titled "System for Automatically Routing Calls To Call Center Agents in an Agent Surplus Condition Based on Delay Probabilities", "System for Automatically Predicting Call Center Agent Work Time in a Multi-skilled Agent Environment", "System for Automatically Routing Calls To Call Center Agents in an Agent Surplus Condition Based on Agent Occupancy", filed on the same date as the present application.

1. Field of the Invention

This invention relates to Automatic Call Distribution (ACD) systems also termed "call centers" and to a call routing process that routes incoming calls to a destination call center agent in a manner that is appropriate to the incoming call and the agent skill level.

2. Problem

It is a problem in customer service scenarios, such as a call center, that these systems are architected in a manner to minimize the cost of providing the offered services pursuant to some predefined level of responsiveness to customers' requests. The call center systems typically provide a pool of customer service representatives (termed "agents" herein), who have various skill levels, to provide the customer with a substantially appropriate response to their inquiry (also termed a "contact" herein).

The agents are managed by a call center administrator who manually generates metrics representative of various agent performance factors, including but not limited to: speed of processing the request, competence in providing the customer with appropriate data, knowledge of the subject matter, and the like. Call center call routing systems use these metrics to interconnect a customer with an available agent who is determined to have the skills to most efficiently process the contact. The definition of these metrics and the efficiency measure are highly subjective and typically fail to recognize many other factors that are relevant to the processing of an incoming contact.

In addition, most call center agent management systems are focused on call surplus conditions where there are more incoming calls than agents available to process the incoming calls. The call center maintains one or more call queues to maintain the received incoming calls in an active state until an agent with the necessary skill becomes available to process the incoming call. When an agent becomes available in existing call centers, the agent's skills are determined and the highest-priority, oldest-waiting call that matches the agent's highest priority skill is routed to this agent. Some of these skills are provided by many agents while other skills are provided by very few agents. The expectation is that multi-skill agents spend most of their time handling calls in the smaller, specialized skill pools, while providing backup to the larger, general-purpose skill pools. However, a problem with this protocol is that the callers who require an agent with the general purpose skills receive a higher level of service due to the fact that statistically, the number of agents in a skill pool determine the level of service provided. One method of addressing this problem is to over staff the smaller skill pools to equalize the level of service provided, but this is costly and inefficient, since highly trained and highly paid agents are thereby idle an excessive amount of time. The presently available agent management systems fail to provide an adaptable and automatic agent assignment capability to the call center administrator in the case where a number of the agents are multi-skilled.

One system that addresses this problem is disclosed in U.S. patent application Ser. No. 08/992,837, titled "Arrangement for Equalizing Levels of Service Among Skills" wherein the agent selection is based on a determination of which available agent's handling of the incoming call produces the least deviation from selected target performance criteria. In particular, a determination is made of whether the call handler's skill work time exceeds a target skill work time for the skill needed by the incoming call. If so, the call is left waiting for another agent and the agent is left idle to receive another incoming call. Automatically reserving an agent serves to increase the idle times of agents in the smaller skill pools which tends to equalize the level of service provided for the smaller skill pools relative to the larger skill pools. This is a radical departure from prior call center procedures where no agents were idle when there was a call in the incoming call queue.

However, existing call centers do not have the capability to efficiently and automatically fine tune the allocation of agent resources to the incoming calls received at the call center, where the agents are multi-skill capable. In addition, existing call centers fail to provide a plurality of agent allocation paradigms to thereby enable the call center administrator to adapt the operation of the call center to varying incoming call characteristics and agent skill characteristics.

SOLUTION

The above described problems are solved and a technical advance achieved by the present system for automatically routing calls to call center agents in an agent surplus condition based upon agent skill levels, where there is a measure of each agent's competence with a particular skill. The call center administrator is provided with an automatic agent assignment paradigm which functions to automatically increase the efficiency of assigning multiple skill agents to contacts. The presence of an agent surplus condition provides the present system with a plurality of choices in the assignment of the agent to process a presently received contact. Since the agents who staff the call center include multiple skill agents, the system must make a determination of not only which of the available agents is the best equipped to handle the present contact, but also how that assignment statistically affects the efficiency of successive assignments of agents to contacts next received, based upon the past performance of the agents and the call center. Since the traffic load presented to the call center tends to be highly variable and of content that is difficult to predict, the present system optionally provides several automatic agent assignment paradigms that each have a statistically different impact on the performance of the call center, based upon the quality and quantity of the incoming calls.

A first of these processes is the dynamic skill assignment process which extends the use of the mathematical computations, which were developed for Predicted Wait Time and Service Objective for call surplus conditions, to agent surplus conditions. The dynamic skill assignment process assigns skill levels to agents on a per call basis, rather than being limited to a fixed number of manually assigned skill levels. The dynamic skill assignment process creates a weighted advance time (Expected Wait Time) and a weighted probability of delay for each agent skill and each standard queue priority. The weighted probability of delay for each skill and standard queue priority is computed using an exponential moving average that is updated whenever an incoming call is offered to a skill at a given queue priority. The value passed to the exponential moving average is one if the call is queued because there is no available agent and zero if the call is not queued, in that an agent is available.

A second process is the skill target level process which uses the existing percent allocation feature to assign each agent/skill combination such that predefined service targets are met for each call type. This process requires a target service level and a description of the agents available to handle calls. All of an agent's skills are initially treated equally, with the percentage allocation for each of n agent skills being 100%÷n. A weighted service level for each skill is computed using an exponential moving average and can be event driven or based upon expected wait time. Periodically, the system determines the skill that is most over its target service level and the skill that is most under its target service level. If any agents are assigned both skills, decrement the allocation for the skill that is over its target service level and increment the allocation for the skill that is under its target service level for each of these agents. The processing can be executed off line in a simulation mode where the processing continues iteratively, the skill target level process decreases the amount by which allocations are incremented and decremented. The skill target level process is repeated a number of times and the results used in agent allocation. Alternatively, the processing is event driven in a real time system.

A third process is the agent occupancy reduction process which reduces the occupancy for some set of the agent population without a significant expenditure of manual administration. The identity of each agent and the skills assigned to each agent are recorded and the service level target of each skill is input. The agent occupancy reduction process analyzes the incoming traffic offered to each skill by computing a weighted service level for each skill using an exponential moving average based upon the expected wait time of that skill. The weighted service level for each skill is periodically updated and the expected wait time is based on the number of agents eligible to receive a call for the skill, the number of calls queued for that skill, and the weighted advance time for that skill. An agent is eligible to receive a queued call for a skill if that agent is available and is not auto reserved for that skill. The value passed to the exponential moving average is based on the ratio of the expected wait time and the administered acceptable service level.

A fourth process is the agent occupancy process which addresses the need for the call center administrator to equalize the occupancy of all agents in the call center regardless of their skills. Existing systems use Least Occupied Agent in an agent surplus condition but only when more than one agent is available and a call arrives. There is no ability of the call center administrator to vary the occupancy of agents relative to others. Estimating agent occupancy is accomplished by computing the weighted call handling time using an exponential moving average that is updated on a call completed basis. The weighted inter-call time is computed using an exponential moving average that is updated when a call is offered to an agent. The agent's occupancy is computed by taking the ratio of the weighted call handling time and the sum of the weighted call handling time and the weighted inter-call time. The skill selection in a call surplus condition is the skill whose active agents have the highest average occupancy relative to the average administered target occupancy for these agents. If two skills are equal, the selected skill is the one with the oldest call waiting. The agent selection in an agent surplus condition is the agent whose occupancy is lowest relative to the administered target occupancy for that agent.

Thus, the present system for automatically routing calls to call center agents in an agent surplus condition provides the call center administrator with an automatic agent assignment paradigm which functions to automatically increase the efficiency of assigning multiple skill agents to contacts.

DETAILED DESCRIPTION

Call Center Philosophy

The call center processing of an incoming call to completion can be divided into three identifiable functions. The first function represents the segmentation phase where the call center identifies customers and determines a quality of service to be provided to this customer. The customer identity is typically determined via Automatic Number Identification data received from the central office that serves the customer and/or the use of an Interactive Voice Response system to collect data from the customer. The call center may also use the customer identity to compute a customer lifetime value, which is an indication of the value of this customer to the operator of the call center. The second function comprises resource selection, wherein the call center selects an agent from the pool of agents, using data from any of a number of sources to identify the service needed by the customer, such as data indicative of the dialed number (where the call center maintains a plurality of listed directory numbers for the each of the various services provided), data from the Interactive Voice Response system indicative of a customer selection of a desired destination or desired service, and/or data from databases maintained in the call center indicative of the customer's previous interactions with the call center, which data can be used to extrapolate the customer's history to predict the service presently required. The identified service request is mapped to a selected agent in the pool of agents as a function of agent skill level, agent availability, customer value, and various other factors. Finally, the third function comprises a fulfillment phase wherein the customer is connected with a selected agent who performs requested function, using the agent's acquired and/or augmented skills. The execution of the final function includes the collection of data regarding the performance of the agent, which data is used to automatically update the agent's skill level. This data collection includes detecting trends in agent performance as well as the extrapolation of detected trends.

Call Center Architecture

Figure 1:
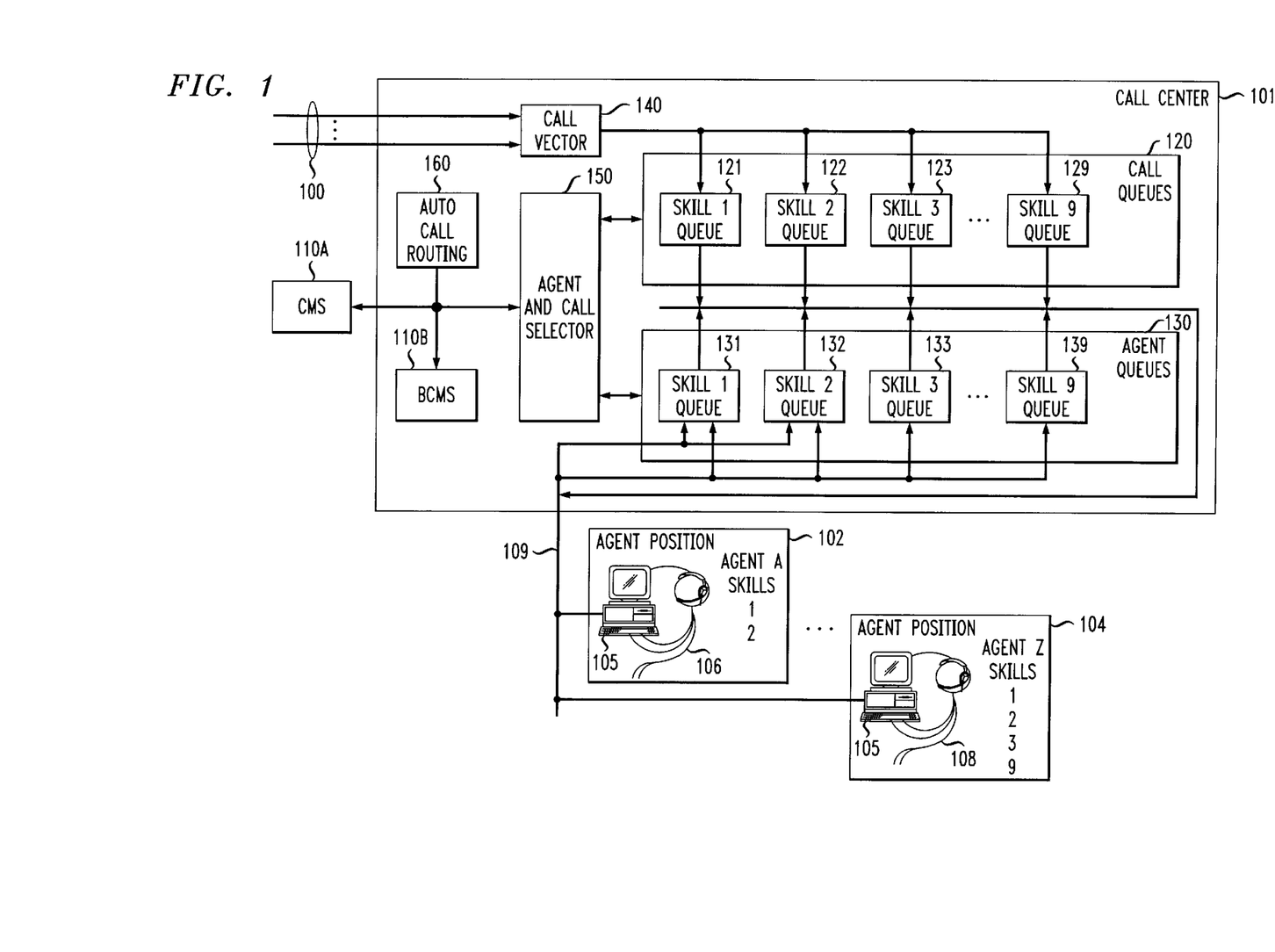
FIG. 1 illustrates in block diagram form a call center which incorporates the present system for automatically routing calls to call center agents.

FIG. 1 illustrates in block diagram form a call center which incorporates the present system for automatically routing calls to call center agents. The call center 101 comprises a plurality of telephone lines and/or trunks 100 which are selectively interconnected with a plurality of agent positions 102–104 via call center 101. Each agent position 102–104 includes a voice and data terminal 105 for use by a corresponding agent 106–108 in handling incoming calls. Data terminals 105 are connected to call center 101 by a voice and data medium 109. Also included in call center 101 is a conventional basic call management system (BCMS) 110B and connected to call center 101 is a conventional call management system (CMS) 110A which gather call records and call center statistics for use in managing the call center and in generating call center reports. For simplicity of description, the conventional basic call management system (BCMS) 110B and conventional call management system (CMS) 110A are collectively termed call center call management system 110 herein.

The call center 101 is an existing telephone switching system, such as the Lucent Technologies Definity® Private Branch Exchange (PBX)-based call center. This call center is a stored program controlled system that includes interfaces to external communication links, a communications switching fabric, service circuits, memory for storing control programs and data, and a processor for executing the stored control programs to control the interfaces and the switching fabric and to provide the call center functionality. However, the use of this call center system in this description is not intended to limit the applicability of the present system for automatically routing calls to call center agents to other call centers and other communication systems, since the applicability of the concepts disclosed herein are not limited to the particular application disclosed herein.

Included in the data stored in the call center 101 are a set of call queues 120 and a set of agent queues 130. Each call queue 121–129 corresponds to a different agent skill as does each agent queue 131–139. Conventionally, calls are prioritized and enqueued in individual ones of call queues 121–129 in their order of priority or are enqueued in different ones of a plurality of call queues 121–129 that correspond to a skill, where each call queue corresponds to a different call processing priority. Likewise, each agent's skills are prioritized according to the agent's level of expertise in that skill, and agents are enqueued in individual ones of agent queues, 9 of which (131–139) are shown in FIG. 1 for illustrative purposes, each of which corresponds to a skill. As shown in FIG. 1, agent A can have skills 1, 2, while agent Z can have skills 1, 2, 3, 9. In addition, the proficiency of an agent with their assigned skills can be defined, using a predefined scale indicative of agent skill proficiency.

Included among the control programs in call center 101 is a call vector program 140 which assigns incoming calls to different call queues 121–129 based upon the agent skill required for proper handling of this call. In addition, agent and call selector program 150 assigns available ones of agents 106–108 to agent queues 131–139 based upon the skills which they possess. Since agents may have multiple skills and different levels of expertise in each of these skills, the agent and call selector program 150 assigns agents 106–108 to different agent queues 131–139 at different expertise levels. Also included among the control programs in call center 101 is a agent and call selector program 150 which effects assignments between incoming calls and available agents in a manner to meet the business goals of the call center, typically to equalize the level of service to each skill.

System for Automatically Routing Calls to Call Center Agents

FIGS. 2–5 illustrate in flow diagram form the operation of the call center of FIG. 1 in the processing of a typical call connection, using the present system for automatically routing calls to call center agents 160 which is operable in conjunction with call vector program 140 and agent and call selector program 150 to provide the call center administrator with an automatic agent assignment paradigm that functions to automatically increase the efficiency of assigning multiple skilled agents to contacts. The processes illustrated in FIGS. 2–5 are described as various ways of achieving this automatic routing of calls to call center agents in an agent surplus condition, any one of which or a plurality of which can be provisioned in the call center 101. The call center administrator can activate a selected one of these processes as the service needs and traffic to the call center 101 dictates to achieve the service goals of the call center 101, and the metrics generated by the selected process are used by the call vector program 140 and agent and call selector program 150 to effect assignments between incoming calls and available agents in a manner to equalize the level of service to each skill.

Each of the automatic agent assignment processes provides the call center administrator with a different bias in the computation of one of the agent characteristics, such as: skill level, target skill level, agent occupancy reduction, agent occupancy equalization. By the proper selection of the agent selection process, the call center administrator can provide an enhanced level of service to the customers served by the call center. Since these agent assignment processes are automatic in their operation, they reduce the need for call center administrator involvement in the agent management process. For example, one way of equalizing the levels of service given to various skills is to increase the idle time of agents who serve the smaller skill pools. Instead of overstaffing these smaller skill pools to obtain an increased agent idle time, agents can automatically be held in reserve when their performance meets a predefined target. In this situation, one or more agents may be idle even though calls are waiting in one or more skill queues served by these agents. An additional aspect is the automatic and dynamic assignment of skill levels to an agent, which can be implemented on a per call basis, to thereby more accurately represent the present state of the call center and its agents, than can be done manually by the call center administrator.

Since all media types can be accepted, the call center 101 determines the nature of the data content and format in the incoming call: E-Mail, voice, WEB connection, Interactive textual data, facsimile transmission, and the like. The call center 101 reviews the status of the available resources, including: human agents, Voice Response Unit ports, facsimile machines, servers, automated agents, and the like. However, in order to simplify this description, the following description is voice-centric, although it is evident that contacts with the call center 101 can be made via other media, including the Internet, private networks, cellular communication systems, and the like. Thus, on an incoming call, the identity of the customer, customer query information input by the customer, and the like are transmitted to the agent and call selector program 150 which performs the agent selection process when a call that is determined to require a skill x for its handling arrives at the head of the skill x queue in call queues 120. Agent and call selector program 150 selects the best agent with skill x to handle the call using one of the processes as described below.

There are numerous published references that disclose call center systems and agent assignment processes. Included in these known references is U.S. Pat. No. 5,206,903 which discloses a skills-based automatic call distribution system. U.S. Pat. No. 5,506,898 describes an expected wait time function used in such a system, while U.S. Pat. No. 5,721,770 discloses an implementation of agent vectoring.

Dynamic Skill Assignment Process

Existing call center systems use both Predicted Wait Time and Service Objective as service measurement metrics for the assignment of an agent to handle an incoming call. These metrics are used only when there is a call surplus condition and only affect routing decisions for multi-skilled agents when there are incoming calls queued for more than one of the multi-skilled agent's assigned skills. Thus, the use of these metrics for the assignment of an agent to handle an incoming call may have only minimal impact on existing call center performance measurements such as: Average Speed of Answer, or Percent in Service Level.

Figure 2A:
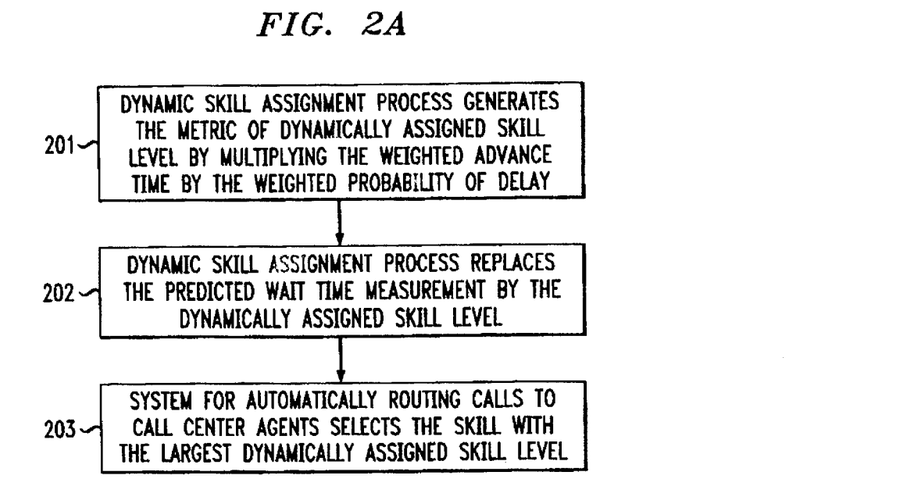
FIGS. 2–5 illustrate in flow diagram form the operation of the call center of FIG. 1 in the processing of a typical call connection, using the present system for automatically routing calls to call center agents.
Figure 2B:
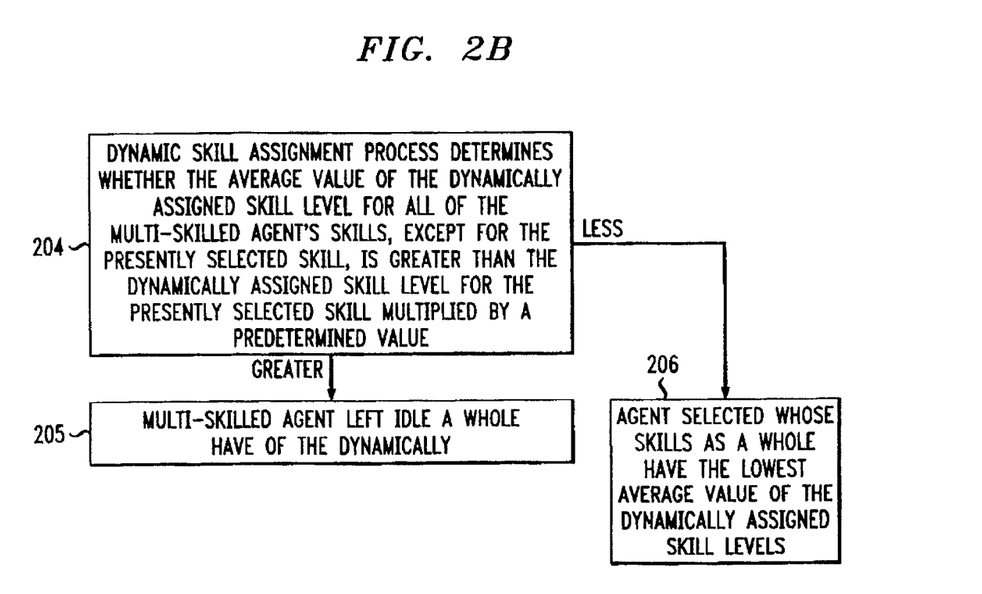

A first of the above-noted automatic agent assignment processes used by the present system for automatically routing calls to call center agents 160, is the dynamic skill assignment process which extends the use of the mathematical computations, developed for call surplus conditions, to determine the metrics of Predicted Wait Time and Service Objective, to agent surplus conditions. The dynamic skill assignment process assigns skill levels to agents on a per call basis, rather than being limited to a fixed number of manually assigned skill levels. The call center 101 creates a Weighted Advance Time (also termed Expected Wait Time) and a Weighted Probability of Delay for both each agent skill and each standard queue priority. The weighted probability of delay for each skill for a multi-skilled agent and standard queue priority are typically computed using an exponential moving average that is updated whenever an incoming call is offered to a skill at a given queue priority. The value passed to the exponential moving average, for example, is one if the call is queued because there is no available agent and zero if the call is not queued, in that an agent is available.

Skill selection: The dynamic skill assignment process, at step 201, generates the metric of Dynamically Assigned Skill Level by multiplying the Weighted Advance Time by the Weighted Probability of Delay. At step 202, the dynamic skill assignment process replaces the Predicted Wait Time measurement (present time in queue plus weighted advance time) generated by the call center 101 by the Dynamically Assigned Skill Level. If all other factors (skill level, queue priority) are equal, the system for automatically routing calls to call center agents 160 at step 203 selects the skill with the largest dynamically assigned skill level.

Algorithm for Reducing Occupancy of Selected Agents: At step 204, the dynamic skill assignment process determines the availability of an agent to serve the call. This is accomplished by determining whether the average value of the dynamically assigned skill level for all of the multi-skilled agent's skills, except for the presently selected skill, is greater than the dynamically assigned skill level for the presently selected skill multiplied by a predetermined value. A multi-skilled agent is intentionally left idle at step 205 even though one or more calls are in queue for one or more of the agent's skills if the average value of the dynamically assigned skill level for all of the multi-skilled agent's skills, except for the presently selected skill, is greater than the dynamically assigned skill level for the presently selected skill multiplied by a predetermined value. Otherwise, at step 206, the system for automatically routing calls to call center agents 160 selects the agent whose skills as a whole have the lowest average value of the dynamically assigned skill level.

Skill Target Level Process

Existing call center systems use percent allocation as an agent assignment metric in call surplus conditions. To apply this concept to agent surplus conditions, the correct percentage allocation assigned to each multi-skilled agent and the skill combination must be determined for each agent configuration and traffic forecast.

Figure 3:
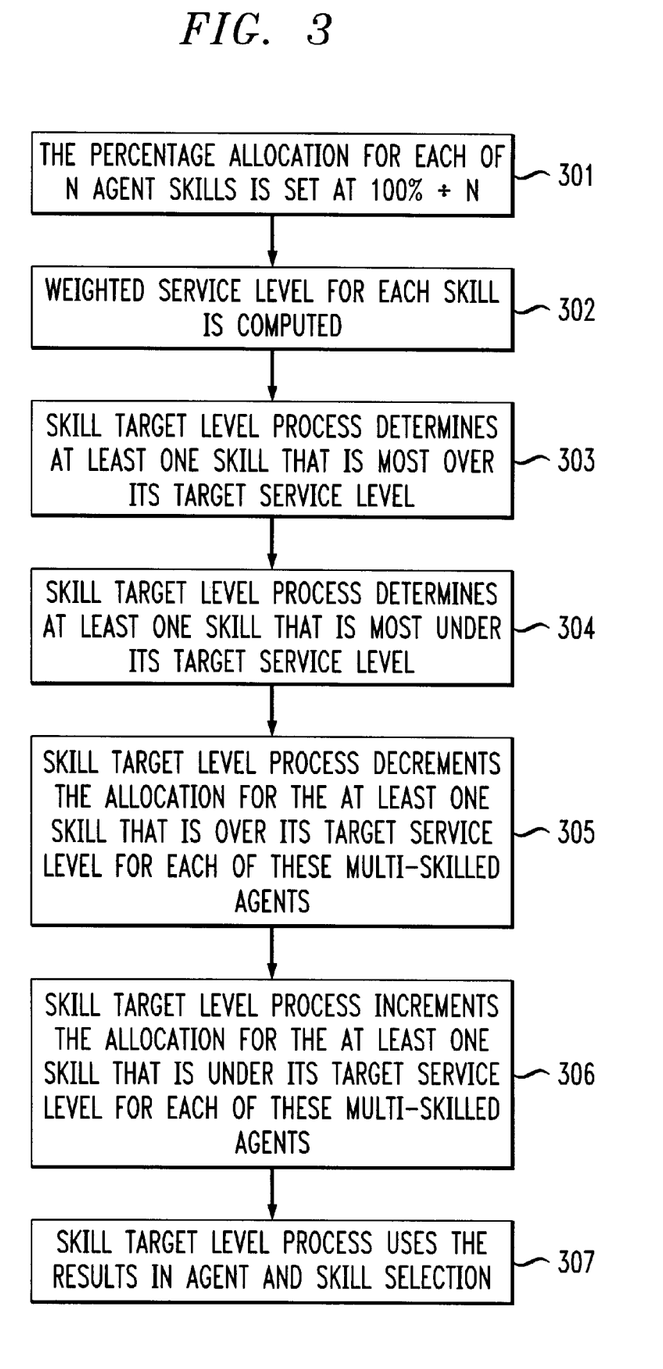

Therefore, a second of the above-noted automatic agent assignment processes used by the present system for automatically routing calls to call center agents 160, is the skill target level process which uses the existing percent allocation feature of call centers to assign each agent/skill combination such that predefined service targets are met for each call type. As shown in FIG. 3, the skill target level process requires a description of the agents available to handle calls and the expected offered load for each call type (skill). In this process, all of a multi-skilled agent's skills are treated equally, with the percentage allocation for each of n agent skills being initially assigned at step 301 as 100%÷n. A weighted service level for each skill is computed at step 302 typically using an exponential moving average and can be event driven or based upon Expected Wait Time. The skill target level process, at step 303, determines at least one skill that is most over its target service level, and, at step 304, at least one skill that is most under its target service level. If any multi-skilled agents are assigned both of these skills, the skill target level process, at step 305, decrements the allocation for the at least one skill that is over its target service level and, at step 306, increments the allocation for the at least one skill that is under its target service level for each of these multi-skilled agents. As processing continues the skill target level process uses the results at step 307 in agent and skill selection.

Agent Occupancy Reduction Process

Meeting arbitrary service level targets (x% of calls processed within y seconds) for all call types within a call center is a goal of call center management. However, inaccurate traffic forecasts, erratic traffic loads, and agent staffing variability impact this goal, and chronic overstaffing is typically used to meet objectives.

Figure 4:
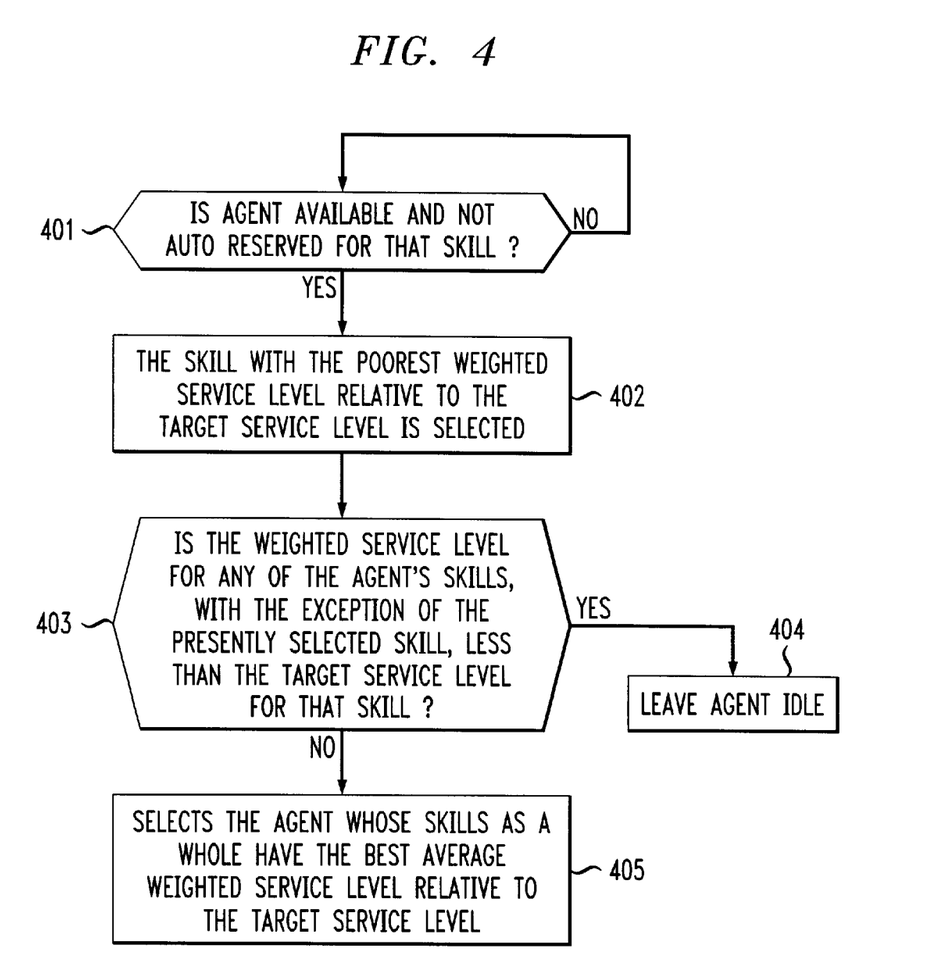

As shown in FIG. 4, a third of the above-noted automatic agent assignment processes used by the present system for automatically routing calls to call center agents 160, is the agent occupancy reduction process which reduces the occupancy for some set of the agent population without a significant expenditure of manual administration. The identity of each agent and the skills assigned to each agent are recorded and the service level target of each skill is input by the call center administrator of the call center 101. The call center 101 analyzes the incoming traffic offered to each skill by computing a Weighted Service Level for each skill using an exponential moving average based upon the Expected Wait Time of that skill. The Weighted Service Level for each skill is periodically updated and the Expected Wait Time is based on the number of agents eligible to receive a call for the skill, the number of calls queued for that skill, and the weighted advance time for that skill.

An agent is eligible to receive a queued call for a skill if that agent is available, as determined at step 401, and is not auto reserved for that skill. The value passed to the exponential moving average is based on the ratio of the Expected Wait Time and the administered acceptable service level.

Skill selection: The system for automatically routing calls to call center agents 160 selects the skill with the poorest weighted service level relative to the target service level at step 402.

Agent Occupancy Reduction: The system for automatically routing calls to call center agents 160 determines whether the weighted service level for any of the agent's skills, with the exception of the presently selected skill, is less than the target service level for that skill at step 403. The system for automatically routing calls to call center agents 160 intentionally leaves an agent idle at step 404 even though one or more calls are in queue for one or more of the agent's skills if the weighted service level for any of the agent's skills, with the exception of the presently selected skill, is less than the target service level for that skill as determined at step 403. Otherwise the system for automatically routing calls to call center agents 160 selects the agent at step 405 whose skills as a whole have the best average weighted service level relative to the target service level.

Agent Occupancy Equalization Process

One intent of call center management is to equalize the occupancy of all agents in the call center regardless of their skills. Existing systems use Least Occupied Agent in an agent surplus condition but only when more than one agent is available and a call arrives. There is no ability of the call center manager to vary the occupancy of agents relative to others.

Figure 5:
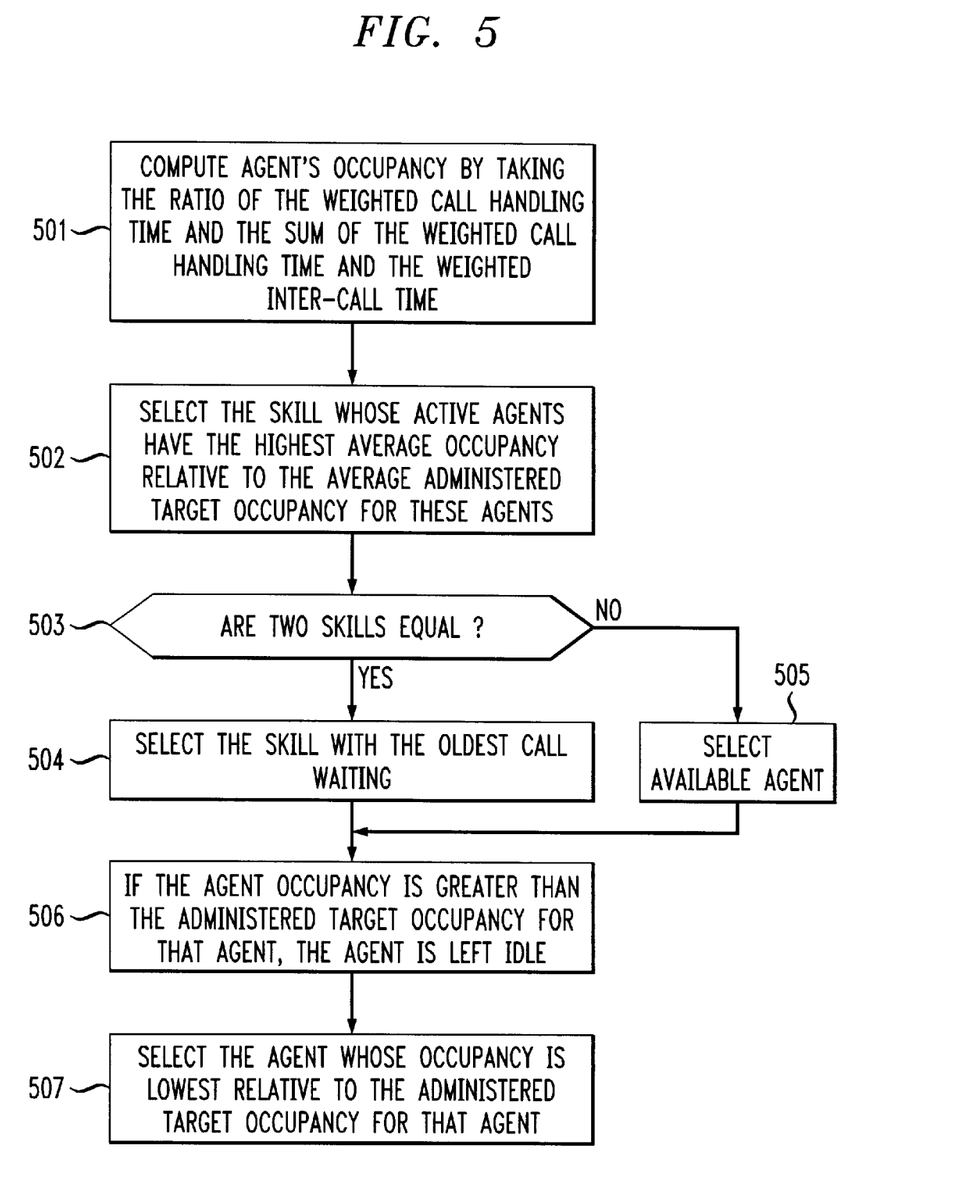

As shown in FIG. 5, a fourth of the above-noted automatic agent assignment processes used by the present system for automatically routing calls to call center agents 160, is the agent occupancy equalization process which addresses the need for the call center administrator to equalize the occupancy of all agents in the call center regardless of their skills. Estimating agent occupancy is accomplished by computing the weighted call handling time using an exponential moving average that is updated on a call completed basis. The weighted inter-call time is computed using an exponential moving average that is updated when a call is offered to an agent. The agent's occupancy is computed at step 501 by taking the ratio of the weighted call handling time and the sum of the weighted call handling time and the weighted inter-call time.

Skill Selection: The system for automatically routing calls to call center agents 160 selects the skill at step 502 whose active agents have the highest average occupancy relative to the average administered target occupancy for these agents. If two skills are equal, the selected skill at step 503 is the one with the oldest call waiting.

Occupancy Reduction: The system for automatically routing calls to call center agents 160 determines the agent's occupancy at step 504 and if the agent occupancy is greater than the administered target occupancy for that agent the an agent is left intentionally idle at step 505 even though there are one or more calls in the queue for one or more of the agent's skills.

Agent selection: The system for automatically routing calls to call center agents 160 selects the agent at step 506 whose occupancy is lowest relative to the administered target occupancy for that agent.

The occupancy of all agents in a call center can be equalized regardless of the number of skills assigned to each agent and regardless of the relative number of calls that are offered to the call center in an agent surplus or call surplus condition. The occupancy of selected agents can also be increased or decreased relative to other agents by assigning appropriate target occupancies to these agents.

SUMMARY

The present system for automatically routing calls to call center agents provides the call center administrator with an automatic agent assignment paradigm which functions to automatically increase the efficiency of assigning multiple skilled agents to contacts. The presence of an agent surplus condition provides the present system with a plurality of choices in the assignment of the agent to process a presently received contact. Since the agents who staff the call center include multiple skill agents, the system must make a determination of not only which of the available agents is the best equipped to handle the present contact, but also how that assignment statistically effects the efficiency of successive assignments of agents to contacts next received, based upon the past performance of the agents and the call center.

What is claimed:

1. A call management system, that is operational in a call center system, for interconnecting a customer who is using a communication device, with a selected one of a plurality of agents who are connected to said call center system, said call management system comprising:

means for retrieving data relating to said customer to determine a service need of said customer;

means, responsive to said determined service need, for selecting a one of said plurality of agents to serve said customer, comprising:

means for storing an identity of each agent, the skills assigned to each agent, and the service level target of each skill, means for computing a Weighted Service Level for each skill, means for selecting an agent whose skills as a whole have the best average Weighted Service Level relative to the target service level; and means for establishing a communication connection through said call center system to said selected one of said plurality of agents who is capable of serving said customer.

2. The call management system of claim 1 wherein said means for computing a Weighted Service Level comprises:

means for determining a ratio of the Expected Wait Time and the administered acceptable service level.

3. The call management system of claim 2 wherein said means for computing further comprises:

means for updating said Weighted Service Level for each skill;

means for updating the Expected Wait Time based on the number of agents eligible to receive a call for the skill, the number of calls queued for that skill, and the weighted advance time for that skill.

4. The call management system of claim 2 wherein said means for comprises:

means, responsive to the weighted service level for any of the agent's skills, with the exception of the presently selected skill, being less than the target service level for that skill, for selecting said agent.

5. The call management system of claim 2 wherein said means for selecting further comprises:

means for intentionally leaving a multi-skilled agent idle, even though one or more calls are in queue for one or more of the agent's skills, when the value of the Weighted Service Level for any of the multi-skilled agent's skills, except for the presently selected skill, is determined to be less than the target service level for that skill.

6. A method of operating a call management system, that is operational in a call center system, for interconnecting a customer who is using a communication device, with a selected one of a plurality of agents who are connected to said call center system, said call management system comprising the steps of:

retrieving data relating to said customer to determine a service need of said customer;

activating a one of a plurality of automatic agent assignment paradigms;

selecting, in response to said determined service need, a one of said plurality of agents to serve said customer as a function of a selected one of said plurality of automatic agent assignment paradigms, with respect to said service need; and establishing a communication connection through said call center system to said selected one of said plurality of agents who is capable of serving said customer.

7. The method of operating a call management system of claim 6 wherein said step of selecting comprises:

storing an identity of each agent, the skills assigned to each agent, and the service level target of each skill; and computing a Weighted Service Level for each skill.

8. The method of operating a call management system of claim 7 wherein said step of computing a Weighted Service Level comprises:

determining a ratio of the Expected Wait Time and the administered acceptable service level.

9. The method of operating a call management system of claim 8 wherein said step of computing further comprises:

periodically updating said Weighted Service Level for each skill;

periodically updating the Expected Wait Time based on the number of agents eligible to receive a call for the skill, the number of calls queued for that skill, and the weighted advance time for that skill.

10. The method of operating a call management system of claim 8 wherein said means for comprises:

selecting, in response to the weighted service level for any of the agent's skills, with the exception of the presently selected skill, being less than the target service level for that skill, said agent.

11. The method of operating a call management system of claim 7 wherein said step of selecting further comprises:

intentionally leaving a multi-skilled agent idle, even though one or more calls are in queue for one or more of the agent's skills, when the value of the Weighted Service Level for any of the multi-skilled agent's skills, except for the presently selected skill, is determined to be less than the target service level for that skill.

12. The method of operating a call management system of claim 7 wherein said step of selecting further comprises:

selecting the agent whose skills as a whole have the best average weighted service level relative to the target service level.

13. A call management system, that is operational in a call center system, for interconnecting a customer who is using a communication device, with a selected one of a plurality of agents who are connected to said call center system, said call management system comprising:

customer characterization means for retrieving data relating to said customer to determine a service need of said customer;

process activation means for activating a one of a plurality of automatic agent assignment paradigms;

agent selector means, responsive to said determined service need, for selecting a one of said plurality of agents to serve said customer as a function of a selected one of said plurality of automatic agent assignment paradigms, with respect to said service need, comprising:

agent identification means for storing an identity of each agent, the skills assigned to each agent, and the service level target of each skill, service definition means for periodically computing a Weighted Service Level for each skill, means for selecting an agent whose skills as a whole have the best average Weighted Service Level relative to the target service level; and switching fabric means for establishing a communication connection through said call center system to said selected one of said plurality of agents who is capable of serving said customer.

14. The call management system of claim 13 wherein said service definition means comprises:

calculation means for determining a ratio of the Expected Wait Time and the administered acceptable service level.

15. The call management system of claim 13 wherein said agent selector means comprises:

means for periodically updating the Expected Wait Time based on the number of agents eligible to receive a call for the skill, the number of calls queued for that skill, and the weighted advance time for that skill.

16. The call management system of claim 15 wherein said means for comprises:

means, responsive to the weighted service level for any of the agent's skills, with the exception of the presently selected skill, being less than the target service level for that skill, for selecting said agent.

17. The call management system of claim 16 wherein said agent selector means further comprises:

agent occupancy control means for intentionally leaving a multi-skilled agent idle, even though one or more calls are in queue for one or more of the agent's skills, when the value of the Weighted Service Level for any of the multi-skilled agent's skills, except for the presently selected skill, is determined to be less than the target service level for that skill.

* * * * *